Nov. 28, 1944.                G. E. BARTON                2,363,477
                       BALL AND SOCKET JOINT ASSEMBLY
                            Filed Jan. 20, 1943

INVENTOR
GILES E. BARTON
By _____ ATTORNEY

Patented Nov. 28, 1944

2,363,477

UNITED STATES PATENT OFFICE 2,363,477

BALL AND SOCKET JOINT ASSEMBLY

Giles E. Barton, San Diego, Calif., assignor to The Ryan Aeronautical Co., San Diego, Calif., a corporation of California Application January 20, 1943, Serial No. 472,944

3 Claims. (Cl. 285—92)

My invention relates to ball and socket joint assemblies, especially those employed in establishing tubular joint connection for the conduction of heated gases coming from combustion engines and being discharged through exhaust manifolds. More particularly, my invention is an improvement upon the universal joint invented by Fred H. Rohr and shown in Letters Patent of the United States No. 2,219,752, granted October 29, 1940.

One object of my said improvement is to furnish such ball and socket joint assemblies with a better means of sealing against leakage of hot gases passing therethrough, while at the same time permitting great flexibility and freedom of movement of the parts of the joint. Another object is to afford a better means of anchorage against displacement of the ball upon the end of the tube section carrying the same. Other objects will appear as illustrated in the drawing and as hereinafter more particularly described and claimed.

I am aware that attempts have heretofore been made, through the employment of sealing rings similar to piston rings or heat resistant packing installed in grooves in the outer wall of the ball, to secure so far as possible a gas tight joint. But such constructions while resulting in some measure of success, have not been completely effective, and I believe myself to be the first in the art to conceive the idea of an arrangement of successive slots formed in the outer wall of the ball within the socket, whereby the heated exhaust gases seeking to escape outwardly through the juncture of the ball and socket are confined therein and compelled to pass successively from one slot to the adjacent slot, and in so doing to be subject to a progressive reduction of pressure until in the last slot proceeding outwardly leakage is reduced to a mimimum.

Attention is hereby directed to the drawing illustrating a preferred form of my invention in which similar numerals of designation refer to similar parts throughout the several views, and in which—

Figure 1:
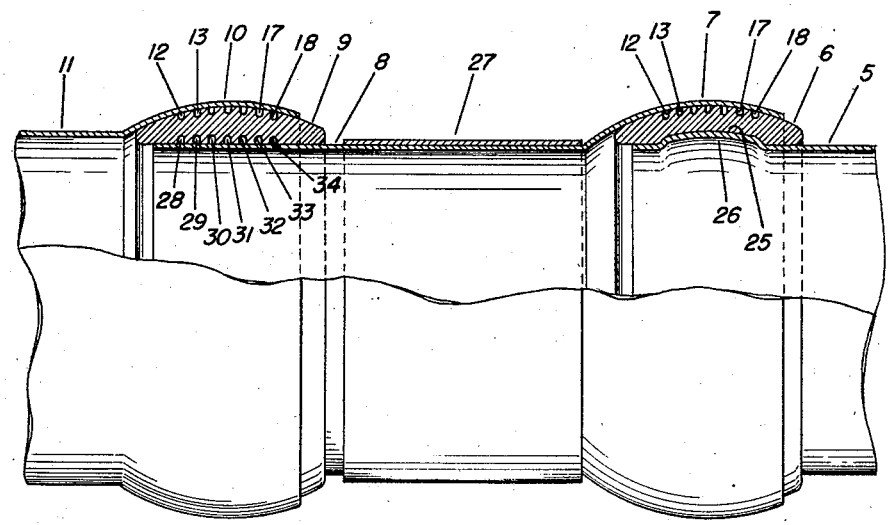
Figure 1 is a longitudinal side elevation, partly in section of my improved ball and socket joint assembly.
Figures 2, 3:
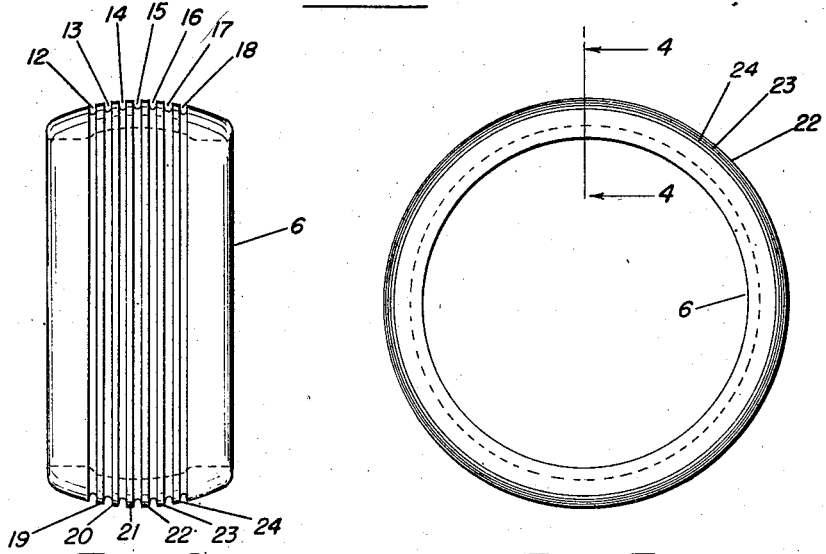
Fig. 2 is a side elevation of the ball of one of the joints.
Fig. 3 is an end view of the ball shown in Fig. 2.
Figure 4:
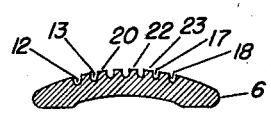
Fig. 4 is a section on line 4—4 of Fig. 3 looking in the direction of the arrows, and showing the preferred arrangement of slots.

Referring to the drawing, the tube 5 is of the usual form of outlet leading from the engine exhaust port to which it is rigidly connected. Upon the outer end of the tube 5 is mounted the ball 6 shaped to engage with the socket 7 of the tubular member 8. For firmer anchorage of said ball 6 to said outlet 5, I prefer to construct the said ball with the shallow annular recess 25 on its interior wall which engages with the annular bulge 26 formed in the adjoining wall of the said outlet, and forms close contact therewith, effectually preventing any possible leakage of gas therethrough. Upon the outer end of the member 8, I mount the ball 9, which is similar in construction to the ball 6, and which engages with the socket 10 of the tubular connection 11 leading to the exhaust manifolds. As will be observed in the drawing, each of the balls has its periphery in contour shaped to engage with the similarly shaped inner surface of its socket, and has such periphery provided with a series of closely spaced parallel spaced annular grooves 12, 13, 14, 15, 16, 17 and 18, and septums 19, 20, 21, 22, 23 and 24, each of which completely encircles the ball circumferentially and is preferably within and covered by the wall of its socket. These circumferential grooves are preferably not less than seven in number, but a greater or less number could be used, depending upon the size of the ball or of the grooves. Thus five of such grooves could be employed with a smaller ball, and with a larger ball a larger number could be used, on occasion eleven or more. Ordinarily, it is desirable that the number of grooves be not so extended as to permit the possible exposure of any of them beyond the coverage of the socket through movements of the parts composing the ball and socket joint, although it is sufficient for the purposes of my invention if any particular groove is covered at some time while the parts are at rest or during the movements thereof. The purpose of these grooves is to provide a series of progressive reduction steps for lowering the pressure of the gases which are tending to force their escape outwardly through the juncture of the ball and socket. Through the arrangement of parts heretofore described, the said gases will first force their way between the walls of said juncture to the first circumferential groove 12 which they will gradually fill; thence they will pass to the groove 13, and then they will progress to and fill in succession grooves 14, 15, 16, 17 and 18, the pressure of the gases being gradually reduced until in such passage further outward leakage is stopped or reduced to a minimum as the gases reach the last groove 18. By this positioning of closely spaced circumferential grooves upon the ball of the socket, I have found that a labyrinth effect is brought about, in that the gases will wander from slot to slot and at length become greatly reduced in pressure; each successive groove allowing expansion of the gases so that as they escape from one groove to another the pressure is diminished. Preferably to insure greater efficiency, the grooves should be formed with sharp edges or corners as shown, such construction aiding retarding the escape of the gases and contributing to the desired reduction in pressure, and also serving to scrape the adjacent wall of the socket and to remove any accumulation of carbon therefrom.

By reason of this arrangement of grooves, I have found that while better sealing of the joints is effected, I am nevertheless able to provide a greater clearance than heretofore of the ball and socket joint, and to permit the ball to turn more freely within its socket. While the shape of the grooves in cross section may as is obvious be varied, I prefer to make the same shallow in depth, and to have them located close together; and in any event the depression of the groove should be substantially greater than the clearance allowed between the adjacent walls of the ball and socket. Friction is also materially reduced between said walls by reason of the reduction of wearing surface brought about by the cutting away of material to form the grooves. Also as a variation of the form and shape of the grooves shown in the drawing, they may be constructed of varying sizes and in varying locations, and are not necessarily disconnected one from the other, and may even take the form of a continuous spiral about the ball. So long as the shape and arrangement of such grooves is such to bring about the reduction in pressure or labyrinth effect effected by my invention, they are to be considered within the spirit and purpose thereof. If desired the inner wall of the ball may be also provided with interior closely spaced annular grooves 28 to 34, as shown in ball 9, which will act in the same manner as the exterior grooves and will produce the same effect, and will afford an additional means for reduction of pressure.

The balls 6 and 9 are preferably made of the metallic composition now widely known as "Ni-resist," and sold by the International Nickel Company, but such balls may be made of cast iron, or any other heat resistant material having substantially the same co-efficient of expansion as the other parts of the joint.

As in the Rohr universal joint above referred to, I may employ the collar 27, which serves to hold the tubular member 8 and tubular connection 11 in proper spaced relationship; but any other means suitable for the purpose could be used if desired.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim and desire to secure by Letters Patent is:

1. A pair of pipe sections for the conduction of gases, and a universal joint connection between said sections, said connection comprising an annulus of exterior spherical contour, one end portion of one of said pipe sections being of spherical contour and snugly slidably embracing said annulus, one end portion of the other pipe section being snugly engaged with said annulus interiorly thereof, said annulus having therein a series of channels disposed in side to side relationship to each other and extending therearound and opening through the exterior face thereof to receive gas which may leak from said pipe sections between the exterior face of said annulus and the interior face of the embracing end portion of said first-mentioned pipe section, said channels being constantly free of solid sealing matter so as at all times to accommodate successively any escaping gas and to permit the gas to expand therein.

2. A pair of pipe sections for the conduction of gases, and a universal joint connection between said sections, said connection comprising an annulus of exterior spherical contour, one end portion of one of said pipe sections being of spherical contour and snugly slidably embracing said annulus, one end portion of the other pipe section being snugly engaged with said annulus interiorly thereof, said annulus having therein a series of channels disposed in side to side relationship to each other and extending therearound and opening through the interior face thereof to receive gas which may escape from said pipe sections between the interior face of said annulus and the exterior face of the end portion of the second-mentioned pipe section, said channels being constantly free of solid sealing matter so as at all times to accommodate successively any escaping gas and to permit the gas to expand therein.

3. A first pipe section, a second pipe section, an intermediate pipe section, and a pair of universal joint connections one between said intermediate pipe section and said first pipe section and the other between said intermediate pipe section and said second pipe section, each joint including an annulus of exterior spherical contour, the annulus between said intermediate and said first pipe sections having an interior annular channel, the first pipe section extending into and snugly fitting its related annulus and being pressed outwardly into the channel thereof, whereby said annulus is held against movement longitudinally relative to said first pipe section, one end portion of said intermediate pipe section being of spherical contour and snugly slidably embracing the spherical exterior of the annulus between said first and said intermediate pipe sections, one end portion of the second pipe section being of spherical contour and snugly slidably embracing the spherical exterior of the annulus between said second and said intermediate pipe sections, and the other end portion of said intermediate pipe section being snugly and longitudinally slidably engaged in said last-mentioned annulus.

GILES E. BARTON.